US008958535B2

(12) United States Patent
Colbert

(10) Patent No.: US 8,958,535 B2
(45) Date of Patent: Feb. 17, 2015

(54) METHOD FOR TRANSFERRING PARTICIPATION AUTHORIZATION FOR A SCHEDULED CONFERENCE CALL

(75) Inventor: Michael Scott Colbert, Debary, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 348 days.

(21) Appl. No.: 13/102,202

(22) Filed: May 6, 2011

(65) Prior Publication Data

US 2012/0281823 A1    Nov. 8, 2012

(51) Int. Cl.
| | |
|---|---|
| H04M 3/42 | (2006.01) |
| H04L 12/16 | (2006.01) |
| H04Q 11/00 | (2006.01) |
| H04M 3/56 | (2006.01) |
| H04M 3/58 | (2006.01) |

(52) U.S. Cl.
CPC .............. H04M 3/563 (2013.01); *H04M 3/58* (2013.01)
USPC ................. 379/202.01; 379/203.01; 370/260; 370/261; 370/262

(58) Field of Classification Search
USPC ......... 379/202.01, 203.01; 370/260, 261, 262
See application file for complete search history.

(56) References Cited

U.S. PATENT DOCUMENTS

| | | | |
|---|---|---|---|
| 2008/0046514 | A1 | 2/2008 | Daughtry et al. |
| 2008/0109517 | A1* | 5/2008 | Sarkar et al. ................... 709/206 |
| 2008/0240391 | A1* | 10/2008 | Nishide ..................... 379/202.01 |
| 2010/0220847 | A1* | 9/2010 | Yap et al. ................. 379/202.01 |
| 2011/0270933 | A1* | 11/2011 | Jones et al. .................... 709/206 |

FOREIGN PATENT DOCUMENTS

GB    2 349 298    10/2000

OTHER PUBLICATIONS

Rosenberg, "RFC 3261—SIP: Session Initiation Protocol", Jun. 2002, pp. 1-252.
Saleem, "Media Server Markup Language", Internet Draft, draft-saleem-msml-07, Aug. 7, 2008, pp. 1-185.
Mobile Telesystems; A new Service: Conference call/ call transfer; http://www.mtsgsm.com/news/2001-09-15-22210. Retrieved Sep. 15, 2001.
"A New Service: Conference Call/Call Transfer," found online at http://www.mtsgsm.com/news/2001-09-05-22210/, Sep. 2001.
Extended European Search Report dated Oct. 20, 2011, for European Patent Application No. 11165034.7.

* cited by examiner

*Primary Examiner* — Nafiz E Hoque
(74) *Attorney, Agent, or Firm* — Fish & Richardson P.C.

(57) ABSTRACT

A method for transferring participation authorization for a scheduled conference call. A conference call server includes a memory for storing conference call scheduling information with respect to a scheduled conference call session, the conference call scheduling information including participant authorizations for eligible communication devices of the scheduled conference call session. The method includes: receiving, in a first communication device, an invitation message containing at least some of the conference call scheduling information with respect to the scheduled conference call session, displaying an interface in relation to the scheduled conference call session, the interface including an option to transfer participant authorization for the scheduled conference call session to a second communication device, and sending a communication to the conference call server for adding participant authorization of the second communication device and removing participant authorization of the first communication device.

18 Claims, 12 Drawing Sheets

METHOD FOR TRANSFERRING PARTICIPATION AUTHORIZATION FOR A SCHEDULED CONFERENCE CALL

FIELD

Example embodiments relate to conference call systems and methods, and in particular to a method for scheduling a conference call.

BACKGROUND

During a conference call, voice or media connections are typically made between two or more communication devices such as telephones or mobile phones.

One difficulty with existing systems is that unauthorized participants may attempt to join a conference call. The participants of a conference call are sometimes loosely defined wherein original invitees can forward invitations to others who can then participate. With only rudimentary security procedures such as a conference call dial-in number and access code almost anyone from any location can be a conference call participant, which could compromise security.

For example, in some traditional systems an individual may forward a conference call invite to another if he or she is unable to attend a meeting. However, at the time of the meeting, either person or both people may join the conference call. This could result in larger-than-expected number of participants, which could compromise security. For conference calls which restrict the number of allowed attendees, it would be unclear why there are more people attending than originally scheduled. It may also be difficult to maintain the security of conferences and prevent unauthorized attendees who might participate due to uncontrolled or accidental forwarding of invitations.

Other difficulties with existing teleconferencing systems will be apparent to those skilled in the art in view of the detailed description below.

BRIEF DESCRIPTION OF THE DRAWINGS

Reference will now be made, by way of example, to the accompanying drawings which show example embodiments, and in which.

Similar reference numerals may have been used in different figures to denote similar components.

DESCRIPTION OF EXAMPLE EMBODIMENTS

Figure 1:
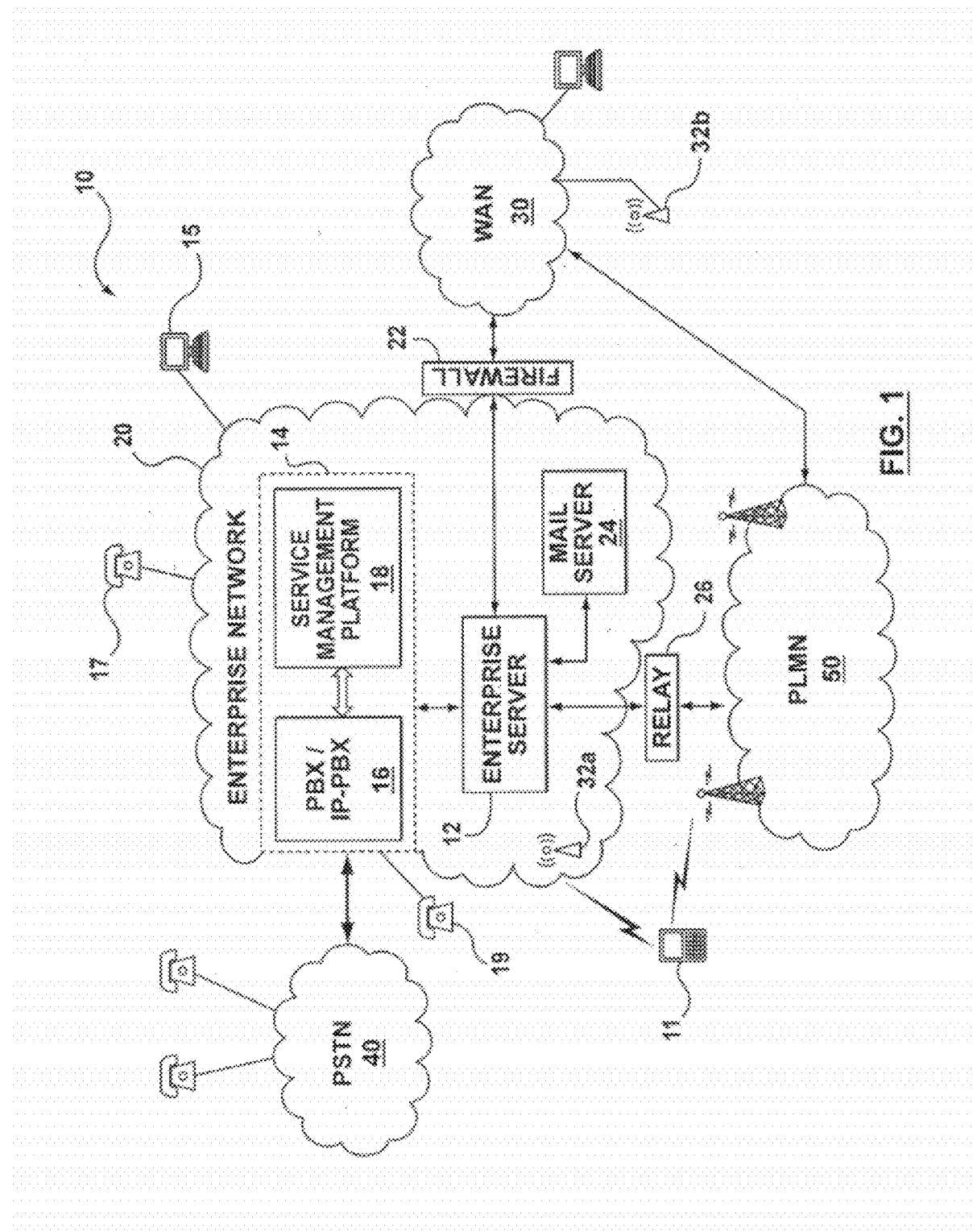
FIG. 1 shows, in block diagram form, an example system for managing enterprise-related mobile calls, including an enterprise communications platform, to which example embodiments may be applied.

Some example embodiments generally relate to transferring of conference call invitations for a scheduled conference call.

In some example embodiments, a conference call server may be configured to assign or allocate participant authorizations for eligible client devices, for permitting participation within a conference call. A forwarded conference call invitation can be used to transfer authorization to join the call from a transferor participant client device to a transferee participant client device. In such a case, joining of the conference call may be restricted to the device that currently holds the invitation.

The conference call server may be configured to assign or allocate the participant authorizations for client devices. Upon forwarding of an invitation by the transferor, the conference call server may change the authorization to only allow the transferee to participate and revoke the authorization of the transferor. The transferor would now be prevented from joining the call, even though he or she was originally the invitee. If the transferee is unable to join, he or she may forward the invitation back to the first person (original transferor); in this case participation authorization goes back to the original invitee. Such a process may permit a single joining to the conference call per invitation, in this case either the transferor or the transferee.

In some further example embodiments, the client device may join a conference in a secure fashion so that only authorized devices can join. This may provide a mechanism for a secure join. A unique identifier that is tied to a device, such as a device PIN (personal identification number) or mobile identifier may be used to authenticate the user.

In one example embodiment, there is provided a method for scheduling a conference call, wherein a conference call server includes a memory for storing conference call scheduling information with respect to a scheduled conference call session, the conference call scheduling information including participant authorizations for eligible communication devices of the scheduled conference call session. The method includes receiving, in a first communication device, an invitation message containing at least some of the conference call scheduling information with respect to the scheduled conference call session, displaying an interface in relation to the scheduled conference call session, the interface including an option to transfer participant authorization for the scheduled conference call session to a second communication device, and sending a communication to the conference call server for adding participant authorization of the second communication device and removing participant authorization of the first communication device.

In another example embodiment, there is provided a communication device including: a controller, a communications subsystem for communicating with a conference call server, wherein the conference call server stores conference call scheduling information with respect to a scheduled conference call session, the conference call scheduling information including participant authorizations for eligible communication devices of the scheduled conference call session, the communications subsystem configured for receiving an invitation message containing at least some of the conference call scheduling information with respect to the scheduled conference call session, and a display for displaying an interface in relation to the scheduled conference call session, the interface including an option to transfer participant authorization for the scheduled conference call session to a second communication device. The controller controls the communications subsystem to send a communication to the conference call server for adding participant authorization of the second communication device and removing participant authorization of the communication device.

In yet another example embodiment, there is provided a non-transitory computer readable medium having recorded thereon statements and instructions for execution by one or more devices for scheduling a conference call, wherein a conference call server includes a memory for storing conference call scheduling information with respect to a scheduled conference call session, the conference call scheduling information including participant authorizations for eligible communication devices of the scheduled conference call session, said statements and instructions comprising code for performing the method.

In yet another example embodiment, there is provided a conference call server including a memory for storing conference call scheduling information with respect to a scheduled conference call session, the conference call scheduling information including participant authorizations for eligible communication devices of the scheduled conference call session, a communications subsystem for communicating with communication devices, and a controller. The controller is configured for: sending, to a first communication device, an invitation message containing at least some of the conference call scheduling information with respect to the scheduled conference call session, receiving, from the first communication device, a communication to transfer participant authorization for the scheduled conference call session to a second communication device, adding participant authorization of the second communication device, and removing participant authorization of the first communication device.

Example embodiments relate to the control and management of conference call communications. Although reference may be made to "calls" and "talk" in the description of example embodiments below, it will be appreciated that some of the described systems and methods may be applicable to session-based communications in general and not limited to voice calls. Reference to calls may for example include shared data (e.g. presentation content) as well as media sessions which may for example include video and/or audio. The various communications may include both synchronous and asynchronous communications to implement such "calls".

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks, primary rate interface (PRI) trunks, or SIP trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as understood in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped with communications modules for cellular communication through the PLMN 50, mobile devices equipped for Wi-Fi communications over one of the WLANs 32, or dual-mode devices capable of both cellular and data communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, 3GPP Long Term Evolution (LTE), or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The mobile devices 11 may be various types of communication devices. Such mobile devices 11 may include "Class A" devices, which are able to function continuously as dual-mode devices, capable of both media and data communications. Mobile devices 11 may also include "non-Class A" devices, which may function as dual-mode devices for initialization or prior to connection with the enterprise communications platform 14, but may lose data functionality once a media session (e.g., voice call) is established. The enterprise network 20 may also include additional client devices which are voice-only or media-only devices, which may be digital or analog for communication with the PSTN or PLMN, and which may not have data capabilities (herein referred to as "voice-only" or "media-only" devices). In other embodiments, the mobile devices 11 may include any suitable client device configured with the communications functionality described herein, and may for example include computer devices, relays, proxies, gateways and any appropriate User Agents (as defined in SIP).

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Generally, the enterprise server 12 is configured to collectively serve the needs of the enterprise network 20, for example to provide and/or synchronize messaging, contacts and calendaring information between servers, desktop workstations 15, and mobile devices 11. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15. The enterprise server 12 may also relay other messages such as instant messaging or text messaging.

As is typical in many enterprises, the enterprise network 20 includes a Private Branch eXchange (although in various embodiments the PBX may be a standard PBX, an IP-PBX, or a cloud-hosted PBX, for simplicity the description below uses the term PBX to any or all of these) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response (IVR), call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
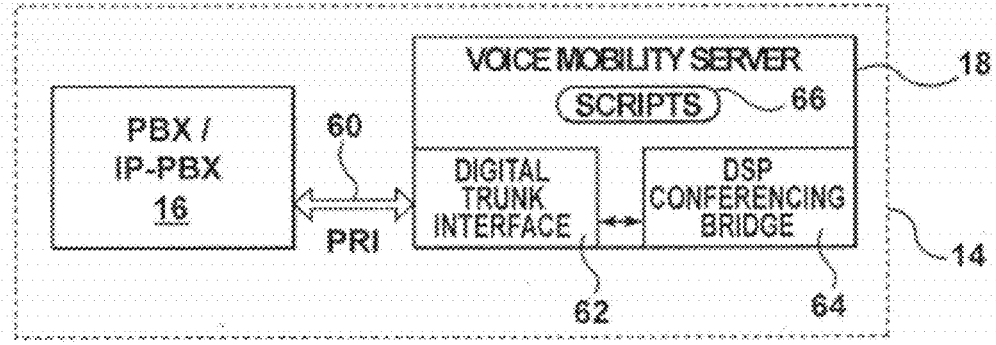
FIG. 2 shows, in block diagram form, further details of an embodiment of the enterprise communications platform.
Figure 3:
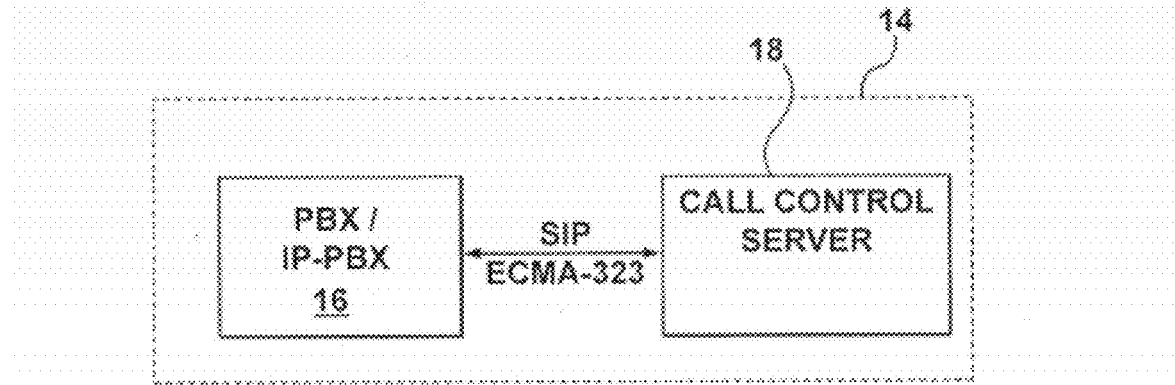
FIG. 3 shows another embodiment of the enterprise communications platform.
Figure 4:
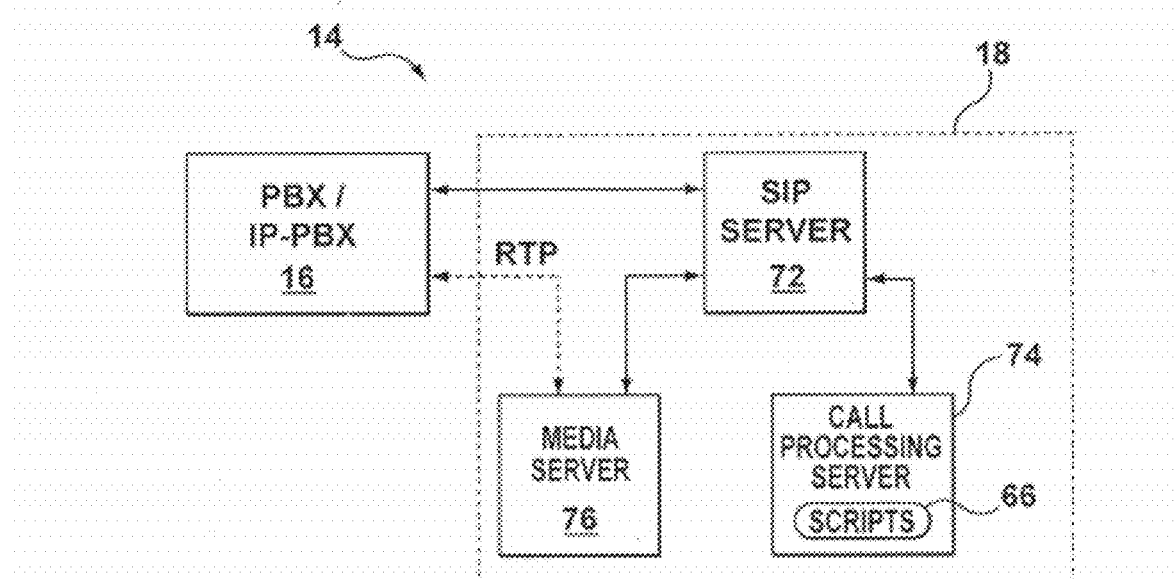
FIG. 4 shows yet another embodiment of the enterprise communications platform.

Reference is now made to FIGS. 2 to 4, which show example embodiments of the enterprise communications system 14. FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art. For example, in example embodiments the service management platform 18 may be separate from the PBX 16; or the service management platform 18 may include a cloud-based system.

Figure 5:
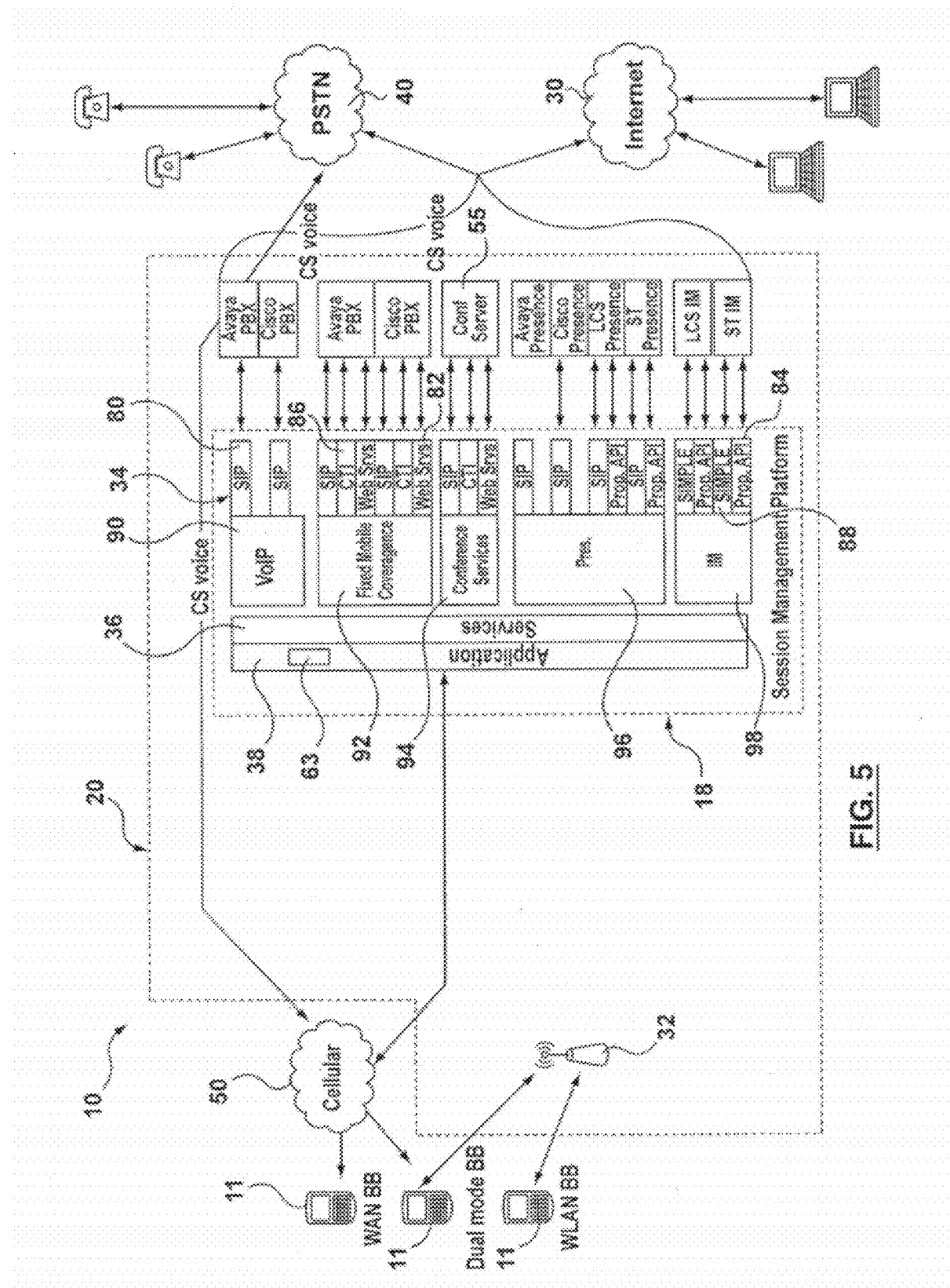
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

Although SIP 80 may be utilized, it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). SIP is defined in J. Rosenberg et al., "RFC 3261—Session Initiation Protocol" (June 2002), the contents of which are herein incorporated by reference.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Example conference call systems and methods in accordance with example embodiments will now be described, referring now to FIG. 6, which shows the system 10 when used or configured as a conference call system. As shown, the enterprise communications platform 14 includes the conference server 55 for providing conference call services for a number of client devices such as mobile devices 11, illustrated as one designated host device 11a and one or more participant devices 11b, 11c, 11d. The mobile devices 11 may collectively form a conference call group. The host device 11a is generally the mobile device 11 or associated user who schedules and hosts a conference call session, and may for example be permitted to perform such hosting functions as roll call, mute all, broadcast only, conference lock, etc.

Generally, in accordance with some example embodiments, one of the devices 11e may be a former participant or "transferor" of a conference call invitation; while one of the other devices 11b may be a "transferee" of a conference call invitation. In some example embodiments, the enterprise communications platform 14 may store in memory an assignment or allocation of participant authorizations for the client devices. Upon forwarding of an invitation by the transferor client device 11e, the enterprise communications platform 14 may change the participation authorization to only allow the transferee client device 11b to participate and revoke the participation authorization of the transferor. The transferor client device 11e would now be prevented from joining the call, even though he or she was originally the invitee. This transfer of participation authorization is illustrated by reference arrow 130. In some example embodiments, the particular participant authorizations may be stored as a whitelist in the memory of the enterprise communications platform 14. In some example embodiments, the participant authorizations may also include a blacklist to identify ineligible devices such as the transferor device 11e.

In some example embodiments, if the transferee client device 11e is unable to join, he or she may forward the invitation back to the original transferor client device 11e; in this case participation authorization goes back to the original invitee client device 11e. Such a process may permit a single joining to the scheduled conference call session per invitation, in this case either the transferor client device 11e or the transferee client device 11b. In some example embodiments, the transferee client device 11e may also forward the invitation (and right to participate) to yet another device (not shown).

The enterprise communications platform 14 and the associated conference server 55 may be used for generally executing conference call functions. As described above, in example embodiments, the enterprise communications platform 14 may include or be coupled to the media server 76 (FIG. 4), wherein the enterprise communications platform 14 controls the media handling and media sessions of the media server 76.

Figure 6:
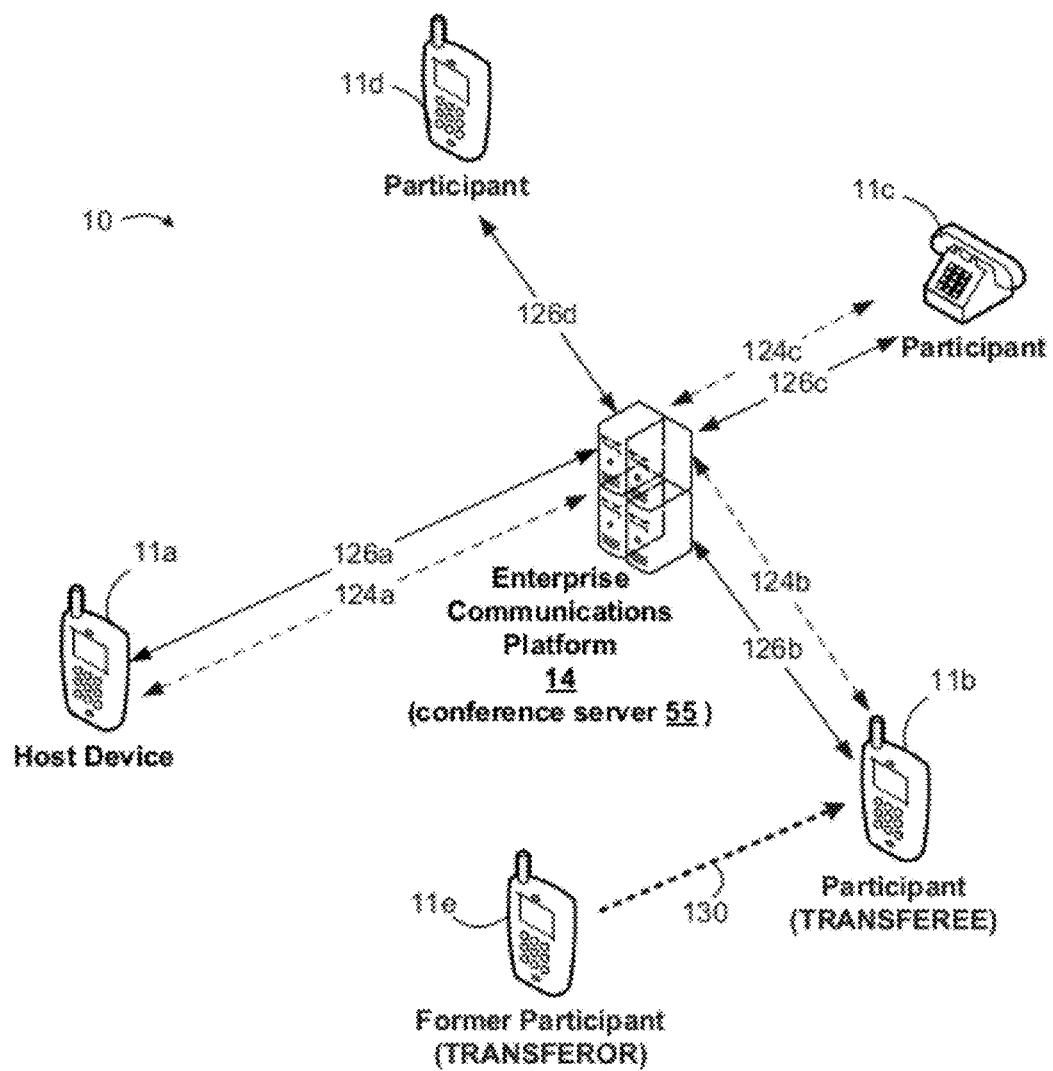
FIG. 6 shows, in block diagram form, a conference call system including the enterprise communications platform shown in FIG. 1 and client devices.

Referring still to FIG. 6, in order to implement some of the conference call functions described herein, the enterprise communications platform 14 may communicate with the mobile devices 11 by way of media sessions and/or control sessions. Specifically, as shown in FIG. 6, the mobile devices 11 communicates via media sessions 126 (shown as solid lines) and control sessions 124 (shown as dashed lines to distinguish from the media sessions 126). For example, the designated host device 11a communicates via media session 126a and control session 124a. Participant device 11b communicates via media session 126b and control session 124b. Participant device 11c communicates via media session 126c and control session 124c. In some embodiments, as shown, the participant device 11d may merely communicate via media session 126d over the PLMN 50 (FIG. 1) or PSTN 40 (FIG. 1) only (without an associated control session).

In some example embodiments, the media sessions 126 may be facilitated by the enterprise communications platform 14 by way of Real-time Transport Protocol (RTP) media sessions, and may include voice calls, video calls, circuit-switched calls or VoIP calls. The media sessions 126 may further be encrypted, for example using Secure Real-time Transport Protocol (SRTP). In order to generate or establish a conference call session, the enterprise communications platform 14 connects or links at least some of the call legs of each media session 126. The particular methods and processes for connecting of media sessions 126 into a conference call session would be understood by those skilled in the art, which may for example be implemented by media shuffling or SDP (Session Description Protocol) media shuffling, etc.

In some example embodiments, a data connection (e.g. the same data connection as used by the control sessions 124) can be further used to provide additional data sharing between mobile devices 11. For example, during a conference call, the host mobile device 11a may provide or transfer a data file to the remaining mobile devices 11. Data sharing may also include Web Services or sharing of presentation content.

In some example embodiments, during a conference call session, the enterprise communications platform 14 can receive Global Positioning System (GPS) information from at least some of the participant devices 11, and can send the received GPS information to the devices 11, to provide location based positioning services between the devices 11.

Figure 7:
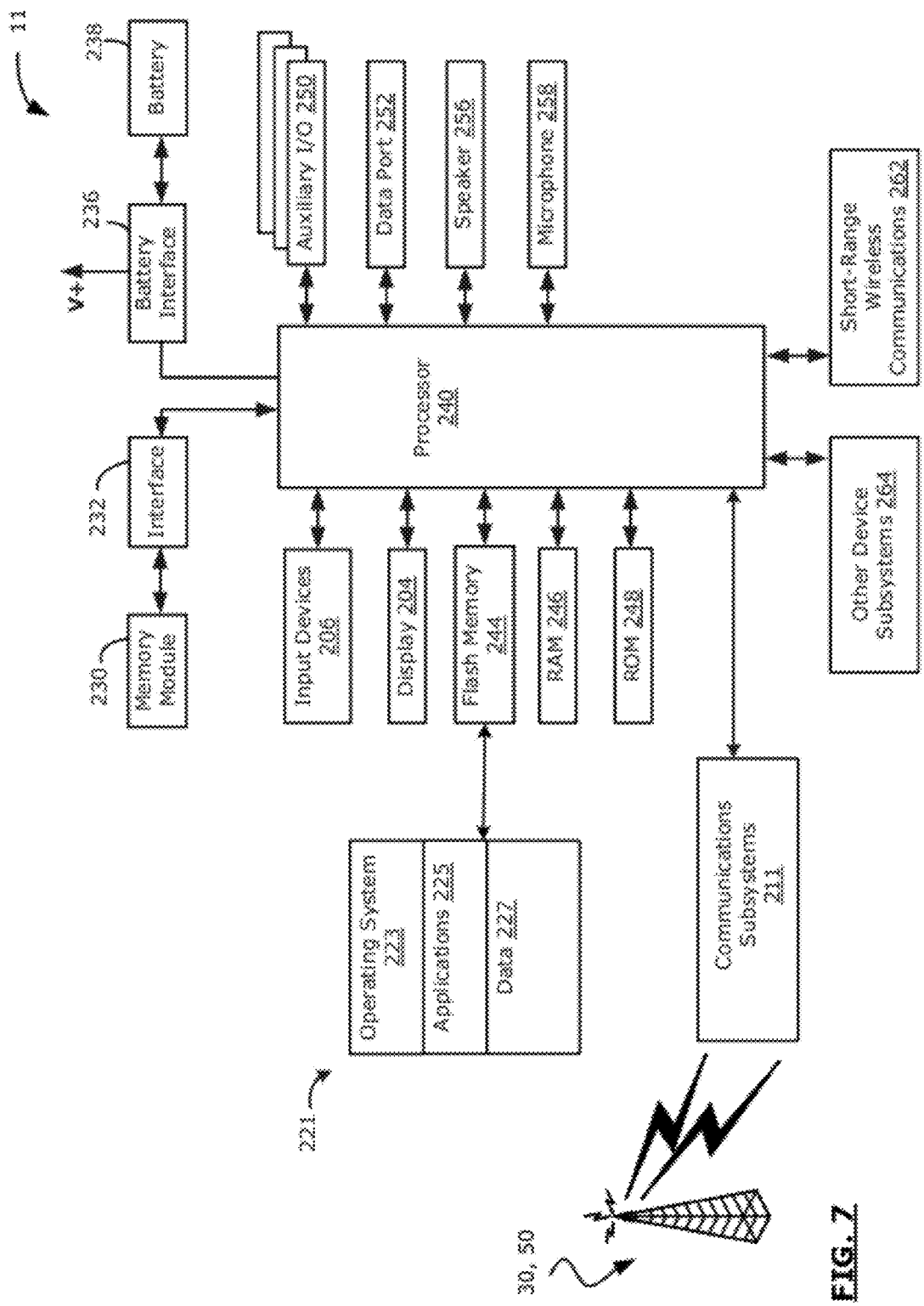
FIG. 7 shows a block diagram illustrating a mobile communication device in accordance with an example embodiment.

Reference is now made to FIG. 7 which illustrates in detail a mobile device 11 in which example embodiments can be applied. The mobile device 11 is a two-way communication device having data and voice communication capabilities, and the capability to communicate with other computer systems, for example, via the Internet. Depending on the functionality provided by the mobile device 11, in various embodiments the mobile device 11 may be a handheld device, a multiple-mode communication device configured for both data and voice communication, a smartphone, a mobile telephone or a PDA (personal digital assistant) enabled for wireless communication.

The mobile device 11 includes a rigid case (not shown) housing the components of the mobile device 11. The internal components of the mobile device 11 may, for example, be constructed on a printed circuit board (PCB). The description of the mobile device 11 herein mentions a number of specific components and subsystems. Although these components and subsystems may be realized as discrete elements, the functions of the components and subsystems may also be realized by integrating, combining, or packaging one or more elements in any suitable fashion. The mobile device 11 includes a controller comprising at least one processor 240 (such as a microprocessor) which controls the overall operation of the mobile device 11. The processor 240 interacts with device subsystems such as a wireless communication subsystem 211 for exchanging radio frequency signals with the wireless network (e.g. WAN 30 and/or PLMN 50) to perform communication functions. The processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which may employ any appropriate a wireless (e.g., RF), optical, or other short range communications technology), and other device subsystems generally designated as 264. Some of the subsystems shown in FIG. 2 perform communication-related functions, whereas other subsystems may provide "resident" or on-device functions.

Display 204 may be realized as a touch-screen display in some embodiments. The touch-screen display may be constructed using a touch-sensitive input surface connected to an electronic controller and which overlays the visible element of display 204. The touch-sensitive overlay and the electronic controller provide a touch-sensitive input device and the processor 240 interacts with the touch-sensitive overlay via the electronic controller.

The wireless communication subsystem 211 includes one or more communication systems for communicating with wireless WAN base stations 30 and wireless LAN access points 32 within the wireless network. The particular design of the wireless communication subsystem 211 depends on the wireless network in which mobile device 11 is intended to operate. The mobile device 11 may send and receive communication signals over the wireless network after the required network registration or activation procedures have been completed.

The processor 240 operates under stored program control and executes software modules 221 stored in memory such as persistent memory 244 or ROM 248. The processor 240 can execute code means or instructions. ROM 248 may contain data, program instructions or both. Persistent memory 244 may contain data, program instructions or both, in some embodiments is rewritable under control of processor 240, and may be realized using any appropriate persistent memory technology, including EEPROM, EAROM, FLASH, and the like. As illustrated in FIG. 2, the software modules 221 comprise operating system software 223 and software applications 225.

Software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may further include a range of applications, including, for example, an e-mail messaging application, address book, calendar application, notepad application, Internet browser application, voice communication (i.e., telephony) application, mapping application, or a media player application, or any combination thereof. Each of the software applications 225 may include layout information defining the placement of particular fields and graphic elements (e.g., text fields, input fields, icons, etc.) in the user interface (i.e., the display 204) according to the application.

The modules 221 may further include a Global Positioning System (GPS) module or application which is configured for detection of a geographical position of the device 11, for example by correlating existing satellites. The GPS module may also receive from the enterprise communications platform 14 the geographical positions of the other devices 11.

In some embodiments, the auxiliary input/output (I/O) subsystems 250 may comprise an external communication link or interface, for example, an Ethernet connection. The auxiliary I/O subsystems 250 may further comprise one or more input devices, including a pointing or navigational tool such as a clickable trackball or scroll wheel or thumbwheel, or one or more output devices, including a mechanical transducer such as a vibrator for providing vibratory notifications in response to various events on the mobile device 11 (e.g., receipt of an electronic message or incoming phone call), or for other purposes such as haptic feedback (touch feedback).

In some embodiments, the mobile device 11 also includes one or more removable memory modules 230 (typically comprising FLASH memory) and one or more memory module interfaces 232. Among possible functions of the removable memory module 230 is to store information used to identify or authenticate a user or the user's account to wireless network (e.g. WAN 30 and/or PLMN 50). For example, in conjunction with certain types of wireless networks, including GSM and successor networks, the removable memory module 230 is referred to as a Subscriber Identity Module or SIM. The memory module 230 is inserted in or connected to the memory module interface 232 of the mobile device 11 in order to operate in conjunction with the wireless network.

The mobile device 11 stores data 227 in a persistent memory 244. In various embodiments, the data 227 includes service data comprising information required by the mobile device 11 to establish and maintain communication with the wireless network (e.g. WAN 30 and/or PLMN 50). The data 227 can also include, for example, scheduling and connection information for connecting to a scheduled conference call.

The mobile device 11 also includes a battery 238 which furnishes energy for operating the mobile device 11. The battery may be coupled to the electrical circuitry of mobile device 11 through a battery interface 236, which may manage such functions as charging the battery from an external power source (not shown) and the distribution of energy to various loads within or connected to the mobile device 11. Short-range communication subsystem 262 is an additional optional component which provides for communication between the mobile device 11 and different systems or devices, which need not necessarily be similar devices. For example, the short-range communication subsystem 262 may include an infrared device and associated circuits and components, or a wireless bus protocol compliant communication mechanism such as a BLUETOOTH communication module to provide for communication with similarly-enabled systems and devices.

A predetermined set of applications that control basic device operations, including data and possibly voice communication applications will normally be installed on the mobile device 11 during or after manufacture. Additional applications and/or upgrades to the operating system software 223 or software applications 225 may also be loaded onto the mobile device 11 through the wireless network (e.g. WAN 30 and/or PLMN 50), the auxiliary I/O subsystem 250, the data port 252, the short-range communication subsystem 262, or other suitable subsystem such as 264. The downloaded programs or code modules may be permanently installed, for example, written into the program memory (e.g., the persistent memory 244), or written into and executed from the RAM 246 for execution by the processor 240 at runtime.

The mobile device 11 may provide two principal modes of communication: a data communication mode and an optional voice communication mode. In the data communication mode, a received data signal such as a text message, an e-mail message, Web page download, or an image file will be processed by the wireless communication subsystem 211 and input to the processor 240 for further processing. For example, a downloaded Web page may be further processed by a browser application or an e-mail message may be processed by an e-mail message messaging application and output to the display 204. A user of the mobile device 11 may also compose data items, such as e-mail messages, for example, using the input devices in conjunction with the display 204. These composed items may be transmitted through the wireless communication subsystem 211 over the wireless network (e.g. WAN 30 and/or PLMN 50). In the voice communication mode, the mobile device 11 provides telephony functions and operates as a typical cellular phone.

Figure 8:
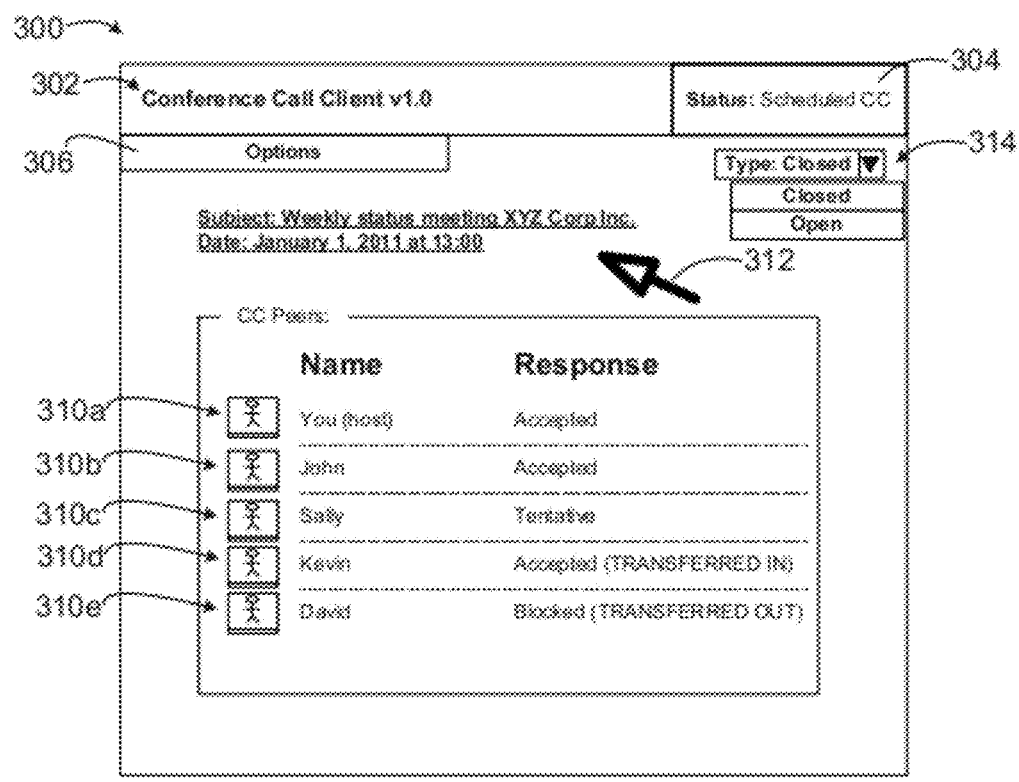
FIG. 8 shows a user interface as displayed on a mobile communication device, for scheduling of a conference call, in accordance with an example embodiment.

Reference is now made to FIG. 8, which shows a user interface 300 displayed on the display 204 for scheduling a conference call, in accordance with an example embodiment. In the example embodiment shown, the user interface 300 is for example implemented by a conference call application (as a stand-alone or in combination with other applications) resident on the mobile device 11 for specifically communicating with the enterprise communications platform 14. The user interface 300 may form part of a conference call session scheduling process. In some example embodiments, the user interface may be implemented in other forms, and may include a mobile phone or tablet-based interface, a video interface, a web interface from a dedicated conferencing and/or mobility server, and/or a plug-in from a calendar or messaging based client (e.g. Microsoft Outlook™). In some example embodiments, the user interface may include instructions conveyed via voice or video with voice (audio) or Dual-tone multi-frequency signaling (DTMF) responses. In some further example embodiments, the interface may be implemented by communication devices such as set-top boxes or other in-home communications devices.

Still referring to FIG. 8, the user interface 300 relates to scheduling of a conference call session having a subject and which is to occur at a scheduled time and date. For example, the time and date of the schedule conference call session may be stored within the conference call application or a calendar application. For example, the scheduled conference call has a subject field of "Weekly status meeting XYZ Corp Inc." and has a scheduled date field of "Jan. 1, 2011 at 13:00". The user interface 300 may be manually triggered by launching and subsequently operating the conference call application.

As shown in FIG. 8, the user interface 300 also includes an options menu 306 to perform functions such as editing the existing scheduled conference call, scheduling new conference calls, and inviting new participants. Conference call scheduling information is sent from the device 11 to the enterprise communications platform 14, which stores the information in a memory and sends an invitation message to the specified participants with the conference call scheduling information. In some example embodiments, the mobile device 11 sends an invitation message directly or indirectly to the recipient invitees.

The enterprise communications platform 14 also maintains tracking information of the participants, and updates the host device 11 accordingly with the tracking information shown in FIG. 8. In some example embodiments, the enterprise communications platform 14 tracks participation by way of the number of sent invitation messages. For example, each invitation message may be assigned its own identifier, and each authorized participant is tracked by assigning to particular invitation messages.

At the time of the scheduled conference call, or a specified time beforehand, the enterprise communications platform 14 may contact each of the devices 11 to join the media sessions together. In example embodiments, the devices 11 may also dial or link into the enterprise communications platform 14 using dialing or address link information received during scheduling.

As shown in FIG. 8, the user interface 300 includes a title bar 302, a status icon 304, an options menu 306, and participant icons (each or individually 310) which represent the status of each participant for the conference call. The participant icons 310 can, for example, be a photo or avatar of the individual user. A cursor 312 is also shown for indicating which item(s) on the user interface 300 are to be selected (e.g., controllable by a user input device such as a touchscreen, touch scrollball or mouse). The status icon 304 displays the present status of the conference call, for example "Scheduled CC" (Conference Call) as shown.

Referring now to the participant icons 310, in the example shown, the user interface 300 is displayed on the host device 11a, indicated as "You (host)" as shown in icon 310a. The participant icon 310d is indicated as "Accepted (TRANSFERRED IN)", while participant icon 310e is indicated as "Blocked (TRANSFERRED OUT)". This means that the client device associated with "David" has transferred out his participant authorization right to join the scheduled conference call; and that the client device associated with "Kevin" has accepted and been transferred a participant authorization right to join the scheduled conference call. In example embodiments, this may be accomplished by "David" transferring or forwarding a conference call invitation message to "Kevin".

The remaining participant icons 310b, 310c represent additional participant devices 11 ("John" and "Sally", respectively, as shown). Contact information such as e-mail address or phone number for the participants can be pre-stored in association with the participant names (or can be manually entered, as appropriate). The status of each participant icon 310 can also be shown, for example, as Accepted, Tentative, Declined, or Blocked.

As shown in FIG. 8, in some example embodiments the host device 11a can also select a menu 314 to designate the scheduled conference call as a "closed" conference call. In a "closed" call, only the specified or eligible participant devices 11 designated by the host device 11a may join the call. Additionally, for example, only a specified number of participants may join the call. In some example embodiments, in a "closed" call further authentication of those participant devices 11 may be performed when attempting to access the scheduled conference call. As shown, the host device 11a also has the option to use the menu 314 to set the scheduled conference call as an "open" conference call, wherein any participant device 11 (designated as eligible or not) may join.

Generally, in some example embodiments, as part of the conference call session scheduling process, after the conference call scheduling information is configured by the host device 11a, the same information is sent and stored to the enterprise communications platform 14. The enterprise communications platform 14 subsequently communicates with each device 11 for inviting to the scheduled conference call and for provisioning at least some of the conference call scheduling information. Each device 11 has an option to Accept, Decline, Tentative, or Transfer. If the device 11 selects Accept, this means that the device 11 will participate in the scheduled conference call. If the device 11 selects Decline, for example, the host device 11a is notified by the enterprise communications platform 14 that the scheduled conference call has been declined by the particular device 11. The notification may be made by phone call, data message, email, etc. If the host device 11a Declines, then the entire scheduled conference call may be cancelled and the other devices 11 notified accordingly. If the device 11 selects Tentative, then the enterprise communications platform 14 notifies the host device 11a accordingly.

Figure 9:
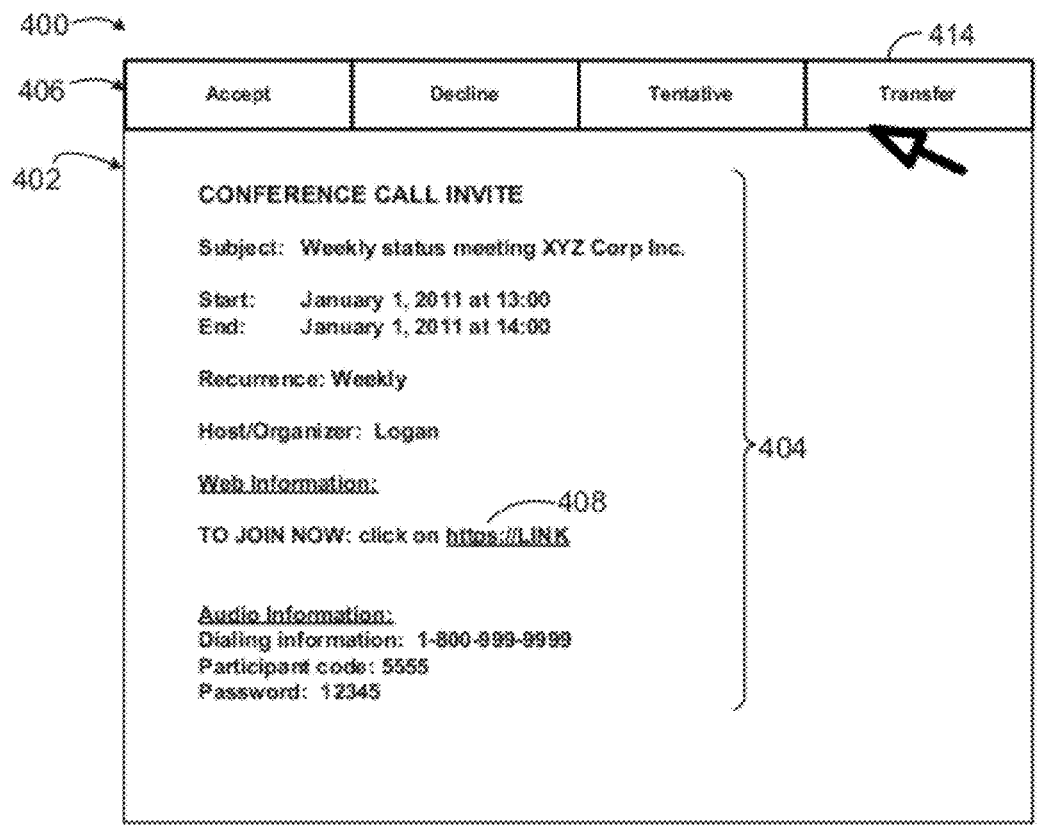
FIG. 9 shows an example user interface for displaying a received invitation message on a mobile communication device, in accordance with an example embodiment.

Thus, reference is now made to FIG. 9, which shows a user interface 400 for displaying a received invitation message 402 on a non-host participant device 11. The device 11 first receives the invitation message 402 from the enterprise communications platform 14 with respect to a scheduled conference call. As shown, the message 402 as displayed can include a number of fields 404 which relate to conference call scheduling information. The fields 404 include Subject, Start time, End time, Recurrence, Host/Organizer, Web Information, and Audio Conference Information.

The invitation message 402 may be received as an e-mail message designating the participant's e-mail address, but can also be in other forms such as short message service (SMS), SIP message, instant messaging, or calendar invite. Note that, in other example embodiments, the message 402 may alternatively be received directly or indirectly from the host device 11a, rather than from the enterprise communications platform 14.

As shown on the interface 400, a number of response options 406 may be selected in order to respond to the invitation message 402. As shown, the response options 406 include Accept, Tentative, or Decline, as described above. Upon selection, the response is sent to the enterprise communications platform 14 for tracking purposes. In further example embodiments, selection of the Accept option may result in the details of the invitation message 402 being stored in a calendar application of the device 11. As shown, the response options 406 can also include an option to Transfer 414 to a new participant client device ("transferee"), thus giving up the right to participate within the scheduled conference call. In some example embodiments, the Transfer 414 option can be further restricted depending on whether the new participant client device is permitted to join the conference call (for a closed call), for example limiting participants to those associated with a same enterprise.

As shown in FIG. 9, the invitation message 402 also includes "Web Information" which includes an option to select an address link 408 to activate a "Join Now" or "Meet Now" function. At the scheduled date and time of the conference call, the device 11 may receive a user input selecting the address link 408 to request joining the conference call session. If the conference call is a closed call, the enterprise communications platform 14 may then authenticate the device 11, for example by authenticating the particular persistent device identifier of the device 11. The device 11 is also verified to determine whether it has properly received participant authorization (e.g., has not transferred the participant authorization away). Upon authentication, a conference call session can be established between the device 11 and the enterprise communications platform 14, which can include a media session 126 (FIG. 6).

As can be appreciated, in some example embodiments the address link 408 identifies the enterprise communications platform 14 as well as the scheduled conference call session and/or the participant identifier, and can include a Uniform Resource Locator (URL), a Uniform Resource Identifier (URI), or other suitable address.

Figure 10:
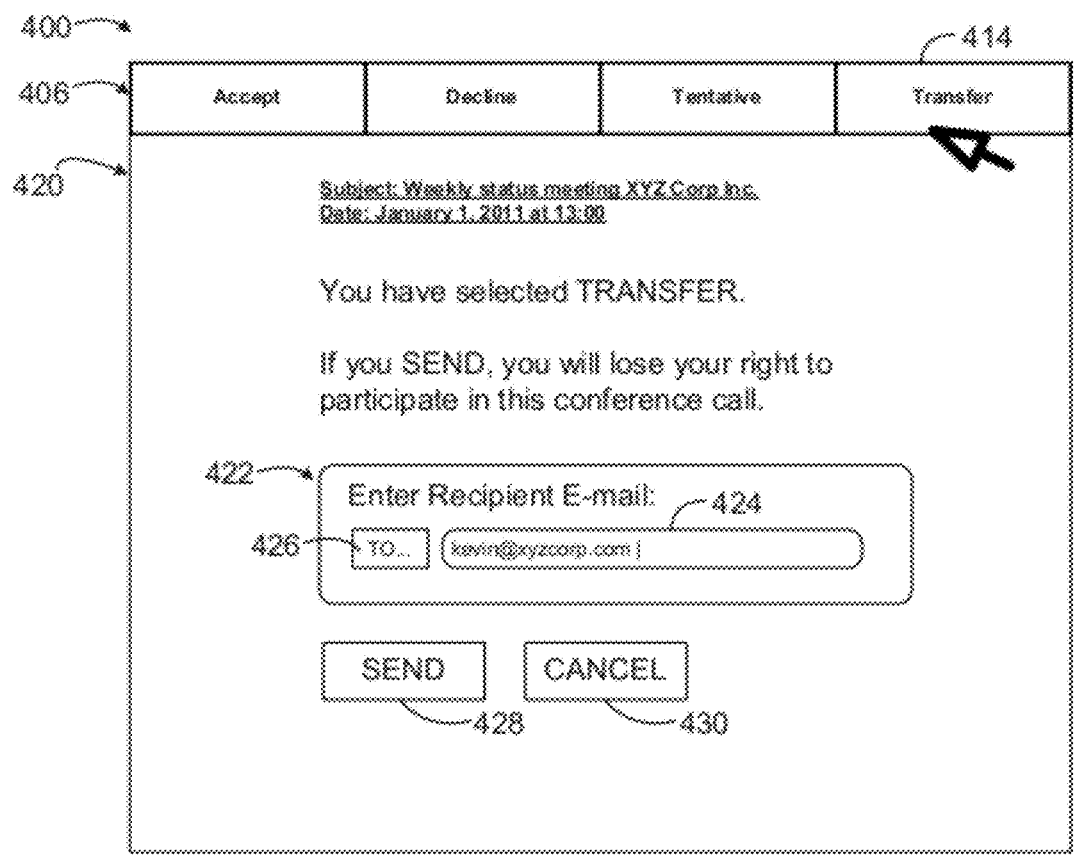
FIG. 10 shows an example user interface for transferring a received invitation message from a mobile communication device, in accordance with an example embodiment.

Reference is now made to FIG. 10, which shows an example user interface 420 displayed on the display 204 of a mobile communication device 11 as a consequence of selection of the Transfer 414 option, in accordance with an example embodiment. As shown, selection of the Transfer 414 option may result in displaying an address interface 422 which includes an address field 424 which can receive, for example, a recipient e-mail address, subscriber identifier, phone number, etc. The recipient will be considered the "transferee" in such an embodiment. Alternatively, the "TO" option 426 may be selected, for populating the address field 424 from an address book of the device 11.

In some example embodiments, a default transferee may be specified within the particular device 11. For example, a user may always wish to always delegate any conflicting meeting requests to a same individual, for example a particular assistant, secretary, staff member, etc. The contact information of the transferee may be pre-populated in the address field 424 in such embodiments. In other example embodiments, a last-used address is pre-populated in the address field 424.

As shown in FIG. 10, the interface 420 may include an appropriate warning or notification to the user, for example "You have selected TRANSFER. If you SEND, you will lose your right to participate in this conference call." The interface 420 may receive selection of the Send 428 option to effect transferring of the call invitation, thereby revoking the right to join the conference call as a participant. In some example embodiments, selection of Send 428 results in the device 11 sending a communication or message to the enterprise communications platform 14. In some other example embodiments, the device 11 sends an invitation message directly or indirectly to the transferee device 11.

Selection of the Cancel 430 option may result in no action being taken and the interface 420 being restored to the original invitation message 402 (FIG. 9).

Figure 11:
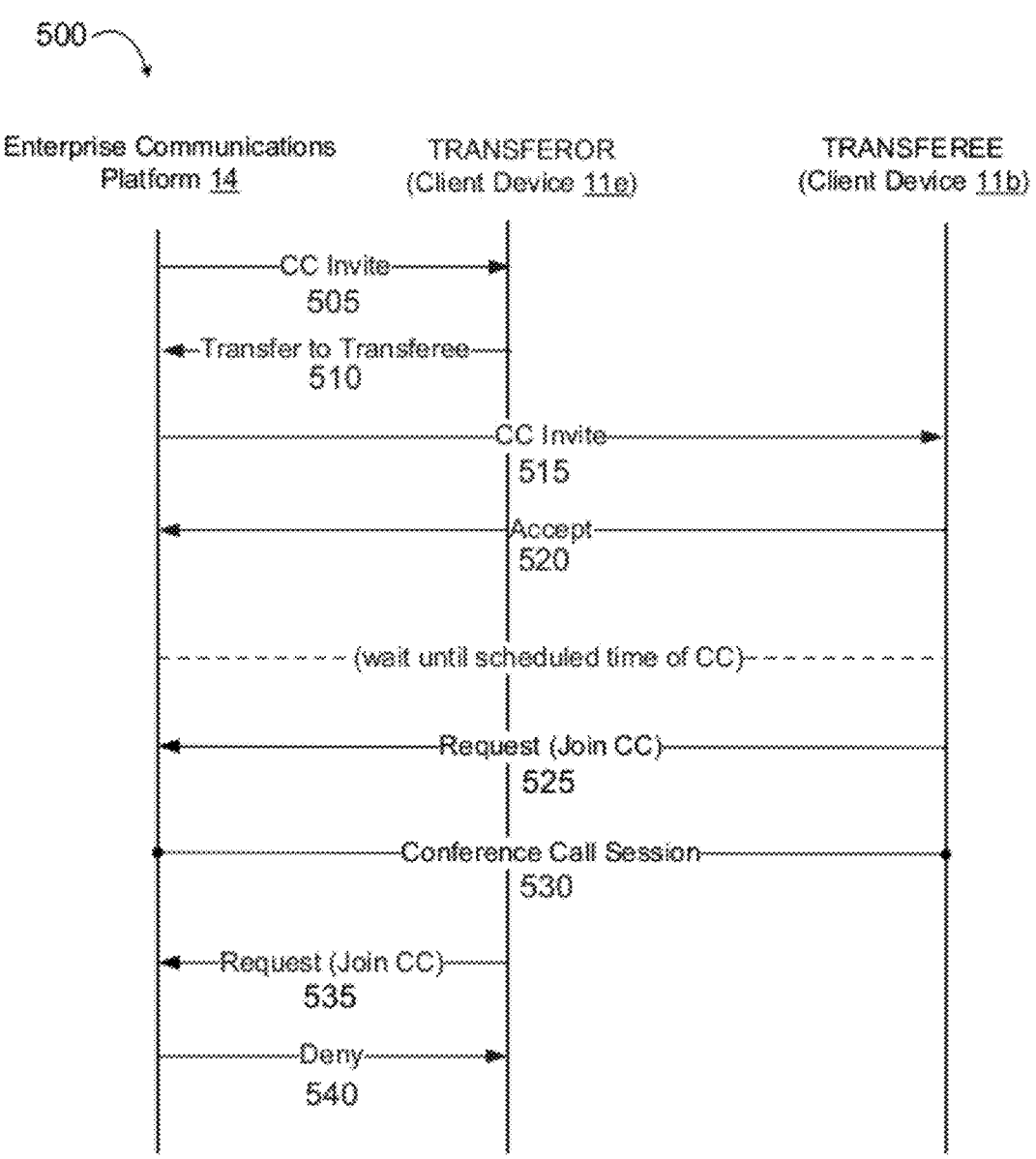
FIG. 11 shows an example conversation between the enterprise communications platform and client devices in accordance with an example embodiment, for transferring an invitation.

Reference is now made to FIG. 11, which shows an example conversation 500 between the enterprise communications platform 14, a transferor device 11e, and a transferee device 11b, in accordance with an example embodiment. Generally, in the example embodiment shown, the enterprise communications platform 14 is responsible for sending a forwarded invitation message to the transferee device 11b. The enterprise communications platform 14 includes a communications subsystem and a memory for storing conference call scheduling information with respect to a scheduled conference call session. For example, the conference call scheduling information includes participant authorizations for eligible communication devices of the scheduled conference call session 11. The participant authorizations can be stored with an identifier of the eligible participant device. Further, particular invitation messages may be tracked and stored within the memory. At step 505, the enterprise communications platform 14 sends to the transferor device 11e an invitation message containing at least some of the conference call scheduling information with respect to the scheduled conference call session. The transferor device 11e displays an interface in relation to the scheduled conference call session, for example the interface 400 (FIG. 9). The interface includes an option to transfer participant authorization for the scheduled conference call session to the transferee device 11b.

At step 510, upon selection of the option through the interface, the transferor device 11e sends a communication to the enterprise communications platform 14 that a transfer is to be performed to the transferee device 11b. The communication can include an identifier or address of the transferee device 11b, for example an e-mail address. In response, the enterprise communications platform 14 adds the participant authorization with respect to the transferee device 11b, and removes participant authorization with respect to the transferor device 11e.

At step 515 the enterprise communications platform 14 sends a invitation message to the transferee device 11b. For example, this may include generating and sending new "Web Information" to the transferee device 11b. This could include, for example, a new address link 408 (FIG. 9) which includes a different identifier. For example, the new invitation message to the transferee device 11b may also include generating and sending new "Audio Information", such as new Dialing information, Participant code, or Password. At step 520, the transferee device 11b can accept the invitation message. Additional transferring or forwarding of invitation messages may be performed as part of this conference call scheduling process.

At step 525, at the time of the scheduled conference call (or beforehand), the transferee device 11b may send a join now request to the enterprise communications platform 14 with respect to the scheduled conference call. For example, this may be accomplished by selecting a "join now" link, or by simply dialing into the enterprise communications platform 14. This may be performed using an identifier of the transferee device 11b, for example an e-mail address, a Personal Information Number (PIN), or a telephone number (e.g. identified using call display). The enterprise communications platform 14 then determines whether there is participant authorization with respect to the transferee device 11b. Since participant authorization was added in the memory of the enterprise communications platform 14 for the transferee device 11b (in this example), in response, at step 530 a conference call session is established, which can include a media leg as between the enterprise communications platform 14 and the transferee device 11b.

Continuing with the example, at step 535, the originally invited transferor device 11e may attempt to join into the conference call. This may be performed using an identifier of the transferor device 11e, for example an e-mail address, a Personal Information Number (PIN), or a telephone number (e.g. identified using call display). In some example embodiments, the transferor device 11e may attempt to use former "Audio Information" (e.g. dial-in number and passcode), which may no longer be valid. Since participant authorization was removed in the memory of the enterprise communications platform 14 for the transferor device 11e (in this example), the particular identifier of the transferor device 11e and/or received passcode would be recognized as not having participant authorization, and a deny communication may be sent at step 540.

Figure 12:
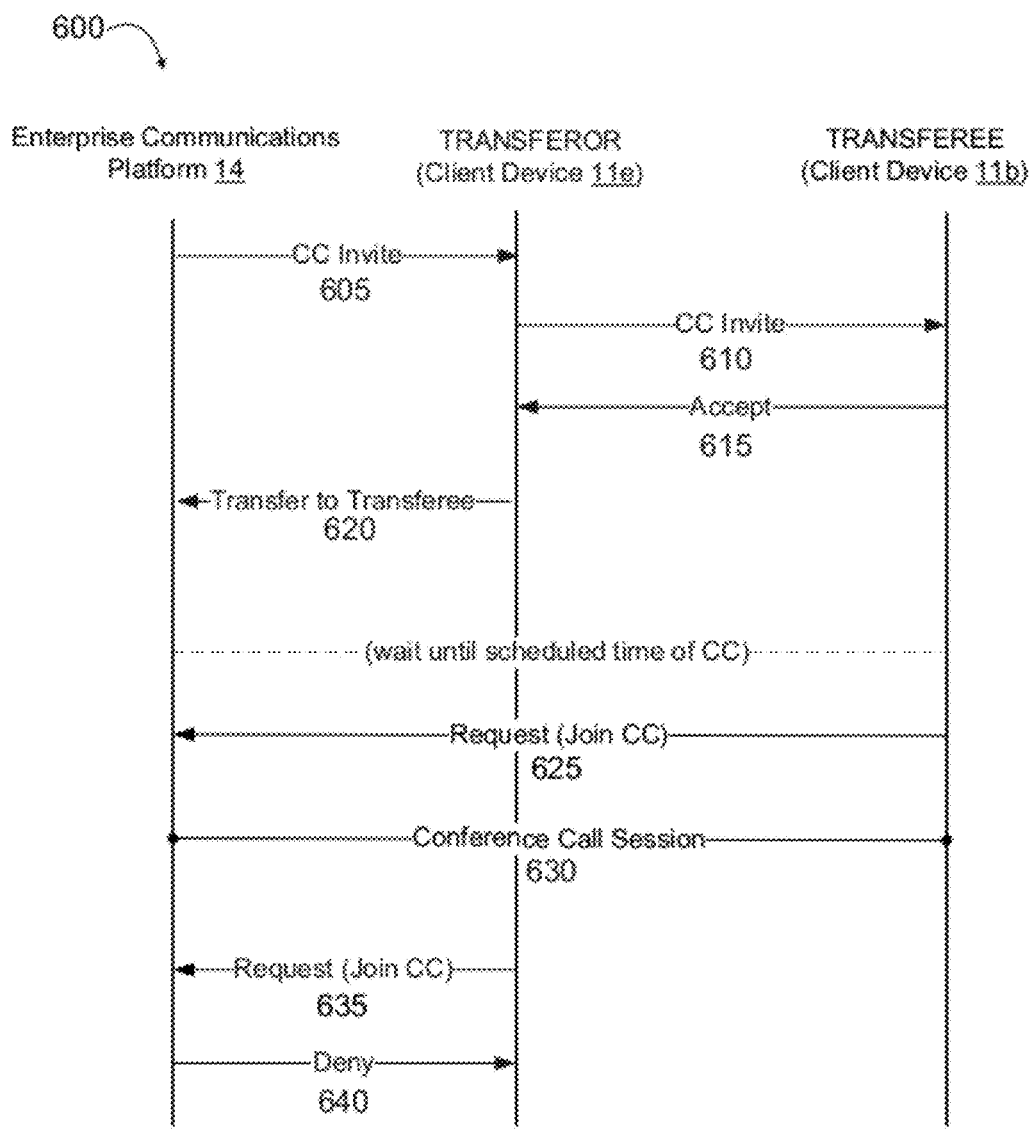
FIG. 12 shows another example conversation between the enterprise communications platform and client devices in accordance with another example embodiment, for transferring an invitation.

Reference is now made to FIG. 12, which shows an example conversation 600 between the enterprise communications platform 14, a transferor device 11e, and a transferee device 11b, in accordance with an example embodiment. Generally, in the example embodiment shown, the transferor device 11e is responsible for sending or forwarding of the original invitation message to the transferee device 11b.

At step 605, the enterprise communications platform 14 sends to the transferor device 11e an invitation message containing at least some of the conference call scheduling information with respect to the scheduled conference call session. The transferor device 11e displays an interface in relation to the scheduled conference call session, for example the interface 400 (FIG. 9). The interface includes an option to transfer participant authorization for the scheduled conference call session to the transferee device 11b.

At step 610, upon selection of the option through the interface, the transferor device 11e sends an invitation message to the transferee device 11b. At step 615, the transferee device 11b accepts the invitation message. In response, the transferee device 11b sends a communication to the enterprise communications platform 14 that a transfer is to be performed to the transferee device 11b. The communication can include an identifier or address of the transferee device 11b, for example an e-mail address. In response, the enterprise communications platform 14 adds the participant authorization with respect to the transferee device 11b, and removes participant authorization with respect to the transferor device 11e.

At step 625, at the time of the scheduled conference call (or beforehand), the transferee device 11b may send a join now request to the enterprise communications platform 14 with respect to the scheduled conference call. For example, this may be accomplished by selecting a "join now" link, or by simply dialing into the enterprise communications platform 14. The enterprise communications platform 14 then determines whether there is participant authorization with respect to the transferee device 11b. Since participant authorization was added in the memory of the enterprise communications platform 14 for the transferee device 11b (in this example), in response, at step 630 a conference call session is established, which can include a media leg as between the enterprise communications platform 14 and the transferee device 11b.

Continuing with the example, at step 635, the originally invited transferor device 11e may attempt to join into the conference call. Since participant authorization was removed in the memory of the enterprise communications platform 14 for the transferor device 11e (in this example), a deny communication may be sent at step 640.

It can be appreciated that each of the transferor device 11e and the transferee device 11b may be associated with different subscribers. For example, a given subscriber may have a multitude of associated devices having a single dial-in phone number, such as office phone, home phone, cellular phone, and/or tablet-based phone.

Figure 13:
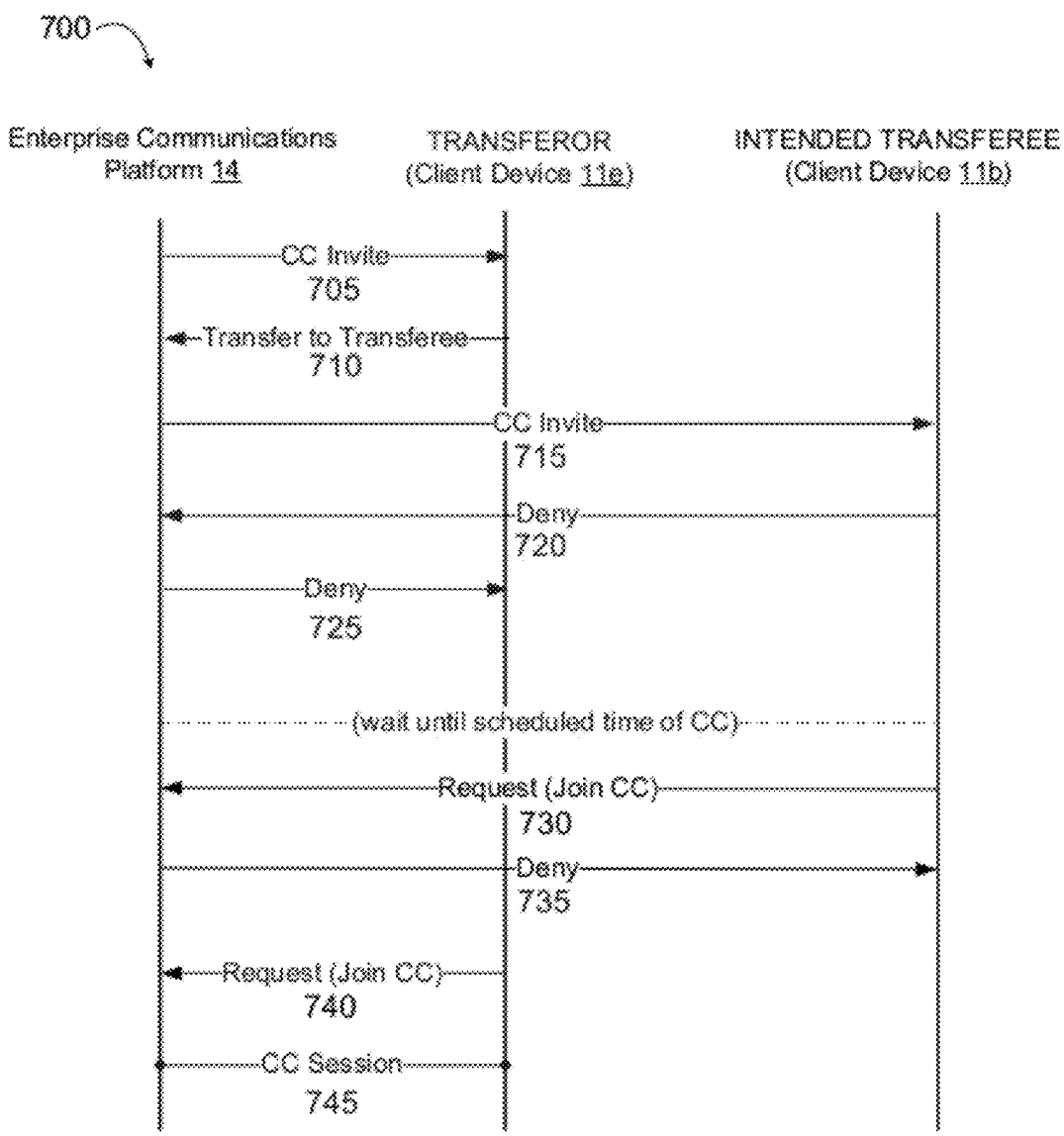
FIG. 13 shows an example conversation between the enterprise communications platform and client devices in accordance with an example embodiment, for rejecting transferring of an invitation.

Reference is now made to FIG. 13, which shows an example conversation 700 between the enterprise communications platform 14, a transferor device 11e, and an intended transferee device 11b, in accordance with an example embodiment. Generally, in the example embodiment shown, the enterprise communications platform 14 is responsible for sending a forwarded invitation message to the intended transferee device 11b, wherein the invitation is rejected or denied by the transferee device 11b. For example, if the conference call session is flagged as a mandatory session, the transferor device 11e may be forced to remain as an attendee if the transfer is not accepted.

At step 705, the enterprise communications platform 14 sends to the transferor device 11e an invitation message containing at least some of the conference call scheduling information with respect to the scheduled conference call session. The transferor device 11e displays an interface in relation to the scheduled conference call session, for example the interface 400 (FIG. 9). The interface includes an option to transfer participant authorization for the scheduled conference call session to the transferee device 11b.

At step 710, upon selection of the option through the interface, the transferor device 11e sends a communication to the enterprise communications platform 14 that a transfer is to be performed to the transferee device 11b. The communication can include an identifier or address of the transferee device 11b, for example an e-mail address.

At step 715 the enterprise communications platform 14 sends an invitation message to the transferee device 11b. At step 520, the transferee device 11b may Deny the invitation message. Accordingly, in the enterprise communications platform 14 the participant authorization remains with the transferor device 11e. At step 725, the enterprise communications platform 14 may notify the transferor device 11e that the transfer was denied and that the participant authorization is maintained with the transferor device 11e. The access code or address link may be changed by the enterprise communications platform 14 at this time and re-sent to the original device 11e.

At step 730, at the time of the scheduled conference call (or beforehand), the intended transferee device 11b may attempt to send a join now request to the enterprise communications platform 14 with respect to the scheduled conference call. Some of the connection information may have been obtained in the received forwarded invitation message, which was rejected. Since participant authorization was not transferred, in response, at step 735 a Deny response is sent to the intended transferee device 11b.

Continuing with the example, at step 740, the originally invited transferor device 11e may attempt to join into the conference call. This may be performed using an identifier of the transferor device 11e, for example an e-mail address, a Personal Information Number (PIN), or a telephone number (e.g. identified using call display). In some example embodiments, the transferor device 11e may use "Audio Information" (e.g. dial-in number and passcode). Accordingly, a conference call session can be established at step 745, which can include a media leg as between the enterprise communications platform 14 and the transferor device 11e.

Figure 14:
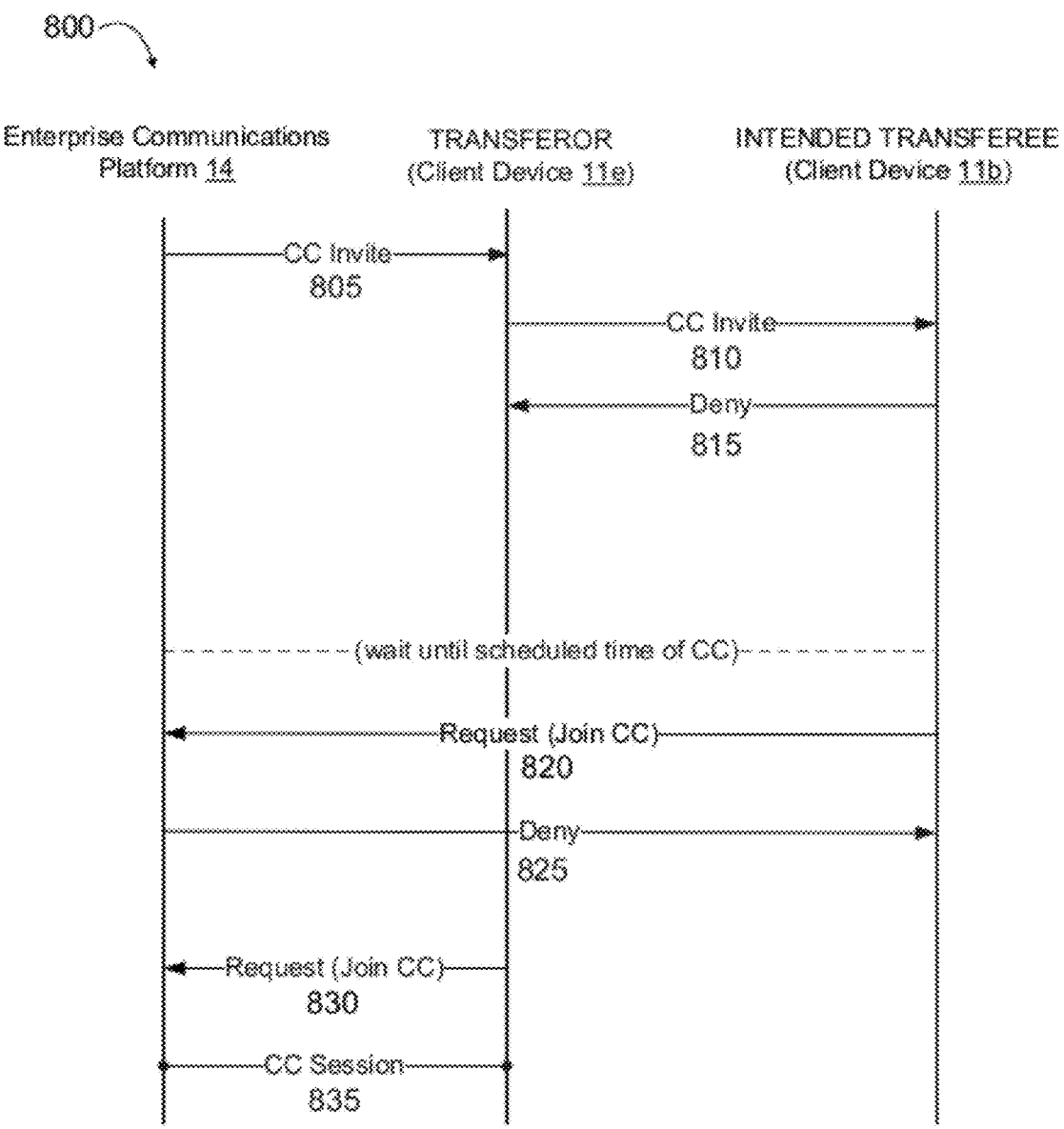
FIG. 14 shows another example conversation between the enterprise communications platform and client devices in accordance with an example embodiment, for rejecting transferring of an invitation.

Reference is now made to FIG. 14, which shows an example conversation 800 between the enterprise communications platform 14, a transferor device 11e, and an intended transferee device 11b, in accordance with an example embodiment. Generally, in the example embodiment shown, the transferor device 11e is responsible for sending or forwarding of the original invitation message to the intended transferee device 11b, which may reject the invitation.

At step 805, the enterprise communications platform 14 sends to the transferor device 11e an invitation message containing at least some of the conference call scheduling information with respect to the scheduled conference call session. The transferor device 11e displays an interface in relation to the scheduled conference call session, for example the interface 400 (FIG. 9). The interface includes an option to transfer participant authorization for the scheduled conference call session to the transferee device 11b.

At step 810, upon selection of the option through the interface, the transferor device 11e sends an invitation message to the transferee device 11b. At step 815, the transferee device 11b rejects the invitation message. Accordingly, in the enterprise communications platform 14 the participant authorization remains with the transferor device 11e. In some example embodiments, not shown, a notice of a transfer attempt may be communicated to the enterprise communications platform 14 from the transferor device 11e or the intended transferee device 11b, for archiving or security tracking purposes.

At step 820, at the time of the scheduled conference call (or beforehand), the intended transferee device 11b may send a join now request to the enterprise communications platform 14 with respect to the scheduled conference call. Some of the connection information may have been obtained in the received forwarded invitation message, which was rejected. Since participant authorization was not transferred, in response, at step 825 a Deny response is sent to the intended transferee device 11b.

Continuing with the example, at step 830, the originally invited transferor device 11e may attempt to join into the conference call. This may be performed using an identifier of the transferor device 11e, for example an e-mail address, a Personal Information Number (PIN), or a telephone number (e.g. identified using call display). In some example embodiments, the transferor device 11e may use "Audio Information" (e.g. dial-in number and passcode). Accordingly, a conference call session can be established at step 835, which can include a media leg as between the enterprise communications platform 14 and the transferor device 11e.

It can be appreciated that each of the transferor device 11e and the transferee device 11b may be associated with different subscribers. For example, a given subscriber may have a multitude of associated devices having a single dial-in phone number, such as office phone, home phone, cellular phone, and/or tablet-based phone. In some example embodiments, participant authorization may be transferred at the subscriber level, to all of the associated devices for that subscriber.

It can be appreciated that the specific words as shown in the various user interfaces are intended to be illustrative only. For example, any suitable words or phrases may be used, and would not be limited to the English language. For example, any number of multi-lingual variations in different languages may be displayed or output from the device.

For example, referring to FIG. 9, the displaying of the transfer 414 option is not limited to the word "Transfer", but can be any suitable text or existing icons such as "Forward". In such embodiments, a warning may still be displayed to the user that participant authorization rights would be revoked.

Variations of the above example methods may be used. While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa. Reference to such words as "sending" or "receiving" could be interchanged depending on the perspective of the particular device.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method for scheduling a conference call, the method comprising:
   receiving, at a first communication device, an invitation message containing at least some conference call scheduling information with respect to a scheduled conference call session, wherein the conference call scheduling information includes participant authorizations for eligible communication devices of the scheduled conference call session;
   displaying an interlace in relation to the scheduled conference call session, the interface including an option to transfer participant authorization for the scheduled conference call session from the first communication device to a second communication device;
   receiving, at the first communication device, an input to transfer the participant authorization for the scheduled conference call session to the second communication device; and
   sending a communication that includes a notification regarding a received input to transfer the participant authorization for the scheduled conference call session to the second communication device and to remove participant authorization of the first communication device.

2. The method as claimed in claim 1 wherein said sending of the communication is performed as part of a conference call scheduling process prior to occurrence of the conference call session.

3. The method as claimed in claim 1 wherein the first communication device and the second communication device are associated with different subscribers.

4. The method as claimed in claim 1 further comprising sending to the conference call server an identifier of the second communication device.

5. The method as claimed in claim 1 further comprising sending a second invitation message to the second communication device containing an invitation to the scheduled conference call session.

6. The method as claimed in claim 5 wherein the first communication device sends the second invitation message.

7. The method as claimed in claim 5 wherein the conference call server sends the second invitation message.

8. The method as claimed in claim 1 wherein each participant authorization is stored with an identifier of each respective eligible communication device.

9. The method as claimed in claim 8 wherein each identifier includes an address which corresponds to each communication device.

10. A communication device comprising:
    a controller;
    a communications subsystem for communicating with a conference call server, wherein the conference call server stores conference call scheduling information with respect to a scheduled conference call session, the conference call scheduling information including participant authorizations for eligible communication devices of the scheduled conference call session, the communications subsystem configured for receiving an invitation message containing at least some of the conference call scheduling information with respect to the scheduled conference call session;
    a display for displaying an interface in relation to the scheduled conference call session, the interface including an option to transfer participant authorization for the scheduled conference call session from the first communication device to a second communication device; and
    wherein the controller controls the communications subsystem to send a communication including a notification to transfer the participant authorization for the scheduled conference call session to the second communication device and to remove participant authorization of the first communication device in response to a received input to transfer the participant authorization to the second communication device.

11. The communication device as claimed in claim 10 wherein said sending of the communication is performed as part of a conference call scheduling process prior to occurrence of the conference call session.

12. The communication device as claimed in claim 10 wherein the first communication device and the second communication device are associated with different subscribers.

13. The communication device as claimed in claim 10 wherein the controller is further configured for sending to the conference call server an identifier of the second communication device.

14. The communication device as claimed in claim 10 wherein the controller is further configured for sending a second invitation message to the second communication device containing an invitation to the scheduled conference call session.

15. The communication device as claimed in claim 10 wherein each participant authorization is stored with an identifier of each respective eligible communication device.

16. The communication device as claimed in claim 15 wherein each identifier includes an address which corresponds to each communication device.

17. A non-transitory computer readable medium having recorded thereon statements and instructions for execution by one or more devices for scheduling a conference call, said statements and instructions comprising code for:
    receiving, at a first communication device, an invitation message containing at least some conference call scheduling information with respect to a scheduled conference call session, wherein the conference call scheduling information includes participant authorizations for eligible communication devices of the scheduled conference call session;
    displaying an interface in relation to the scheduled conference call session, the interface including an option to transfer participant authorization for the scheduled conference call session from the first communication device to a second communication device;
    receiving, at the first communication device, an input to transfer the participant authorization for the scheduled conference call session to the second communication device; and
    sending a communication that includes a notification regarding a received input to transfer the participant authorization for the scheduled conference call session to the second communication device and to remove participant authorization of the first communication device.

18. A conference call server comprising:
a memory for storing conference call scheduling information with respect to a scheduled conference call session, the conference call scheduling information including participant authorizations for eligible communication devices of the scheduled conference call session;
a communications subsystem for communicating with communication devices; and
a controller configured for:
sending, to a first communication device, an invitation message containing at least some of the conference call scheduling information with respect to the scheduled conference call session,
receiving, from the first communication device, a communication to transfer participant authorization for the scheduled conference call session to a second communication device wherein the communication is in response to a received input at the first communication device to transfer the participant authorization for the scheduled conference call session from the first communication device to the second communication device and to remove participant authorization of the first communication device,
adding participant authorization of the second communication device, and
removing participant authorization of the first communication device.

* * * * *